(12) United States Patent
Moulder et al.

(10) Patent No.: US 6,968,654 B2
(45) Date of Patent: Nov. 29, 2005

(54) SOLAR PANEL MOUNTING STRUCTURE, SOLAR PANEL SYSTEM, AND METHODS OF MAKING AND INSTALLING THEREOF

(75) Inventors: Michael J. Moulder, Wilmington, DE (US); Eugene S. Taylor, Jr., Chadds Ford, PA (US)

(73) Assignee: McConnell Energy Solutions, LLC, Greenville, DE (US)

( * ) Notice: Subject to any disclaimer, the term of this patent is extended or adjusted under 35 U.S.C. 154(b) by 24 days.

(21) Appl. No.: 10/460,316

(22) Filed: Jun. 13, 2003

(65) Prior Publication Data

US 2004/0128923 A1 Jul. 8, 2004

Related U.S. Application Data

(60) Provisional application No. 60/438,520, filed on Jan. 8, 2003.

(51) Int. Cl.$^7$ .............................. E04D 13/18; F24J 2/46
(52) U.S. Cl. ..................... 52/173.3; 52/173.1; 126/704; 126/623; 248/148; 248/237
(58) Field of Search .............................. 52/173.1, 173.3, 52/27; 126/704, 623, 621; 220/780, 781, 631; 248/237, 148

(56) References Cited

U.S. PATENT DOCUMENTS

| | | | | |
|---|---|---|---|---|
| 4,058,111 A | * | 11/1977 | Wendel | 126/570 |
| 4,226,256 A | * | 10/1980 | Hawley | 136/244 |
| 4,300,537 A | | 11/1981 | Davis | |
| 4,306,544 A | * | 12/1981 | Clemens | 126/639 |
| 4,378,006 A | * | 3/1983 | Hawley | 126/569 |
| 4,440,861 A | * | 4/1984 | McCarthy | 435/289.1 |
| 4,716,882 A | * | 1/1988 | Ishida | 126/650 |
| 4,832,001 A | | 5/1989 | Baer | |
| 5,125,608 A | * | 6/1992 | McMaster et al. | 248/163.1 |
| 5,232,187 A | * | 8/1993 | O'Farrell et al. | 248/148 |
| 5,289,999 A | | 3/1994 | Naujeck | |
| 5,505,788 A | * | 4/1996 | Dinwoodie | 136/246 |
| 5,768,831 A | | 6/1998 | Melchior | |
| 5,953,869 A | | 9/1999 | Balfour et al. | |
| 6,105,316 A | * | 8/2000 | Bottger et al. | 52/173.3 |
| 6,105,317 A | | 8/2000 | Tomiuchi et al. | |
| 6,360,491 B1 | | 3/2002 | Ullman | |
| 6,370,828 B1 | | 4/2002 | Genschorek | |
| 6,534,702 B1 | * | 3/2003 | Makita et al. | 136/244 |
| 2002/0092246 A1 | * | 7/2002 | Graham | 52/126.1 |

FOREIGN PATENT DOCUMENTS

EP 0 857 926 A1 8/1998

OTHER PUBLICATIONS

Installation Manual for ConSole, from Econergy International B.V., Oct. 2002, available at www.e-conergy.com.

* cited by examiner

*Primary Examiner*—Brian E. Glessner
(74) *Attorney, Agent, or Firm*—Connolly, Bove, Lodgde & Hutz LLP (57) ABSTRACT

A mounting structure for a solar panel unit, and a system of solar panel units are disclosed that are easy to manufacture and to install. The mounting structure has a relatively simple frame that can be formed by sheet metal bending operations. The solar panel unit also has a smooth exterior surface reducing wind uplift forces on the panel unit and the system.

11 Claims, 11 Drawing Sheets

SOLAR PANEL MOUNTING STRUCTURE, SOLAR PANEL SYSTEM, AND METHODS OF MAKING AND INSTALLING THEREOF

RELATED APPLICATIONS

This application claims priority to the provisional application assigned U.S. application Ser. No. 60/438,520, filed in the United States Patent and Trademark Office on Jan. 8, 2003, and entitled "Solar Panel Mounting Structure, Solar Panel System, and Methods of Making and Installing Thereof."

BACKGROUND

1. Technical Field

The technical field relates to solar panel installation. More particularly, the technical field relates to solar panel mounting structures and methods of installation therefor.

2. Background Art

Solar panels for use in commercial and residential environments are known. Solar panels are typically mounted on a mounting structure, which is supported on a mounting surface, such as a rooftop. Existing mounting structures are often overly complicated and difficult to install and manufacture. In addition, many mounting structures present too large a surface area to wind, and are therefore subject to strong wind uplift forces.

U.S. Pat. No. 6,360,491 B1 to Ullman discloses a roof support system for a solar panel. Ullman's system provides secure mounting to a roof structure. However, Ullman requires roof penetrations by lag bolts. Further, the rail system of Ullman requires many parts (see FIG. 10) to mount a panel on the roof. In addition, Ullman's system cannot be relocated without sealing existing roof penetrations and creating new roof penetrations.

Figure 2:
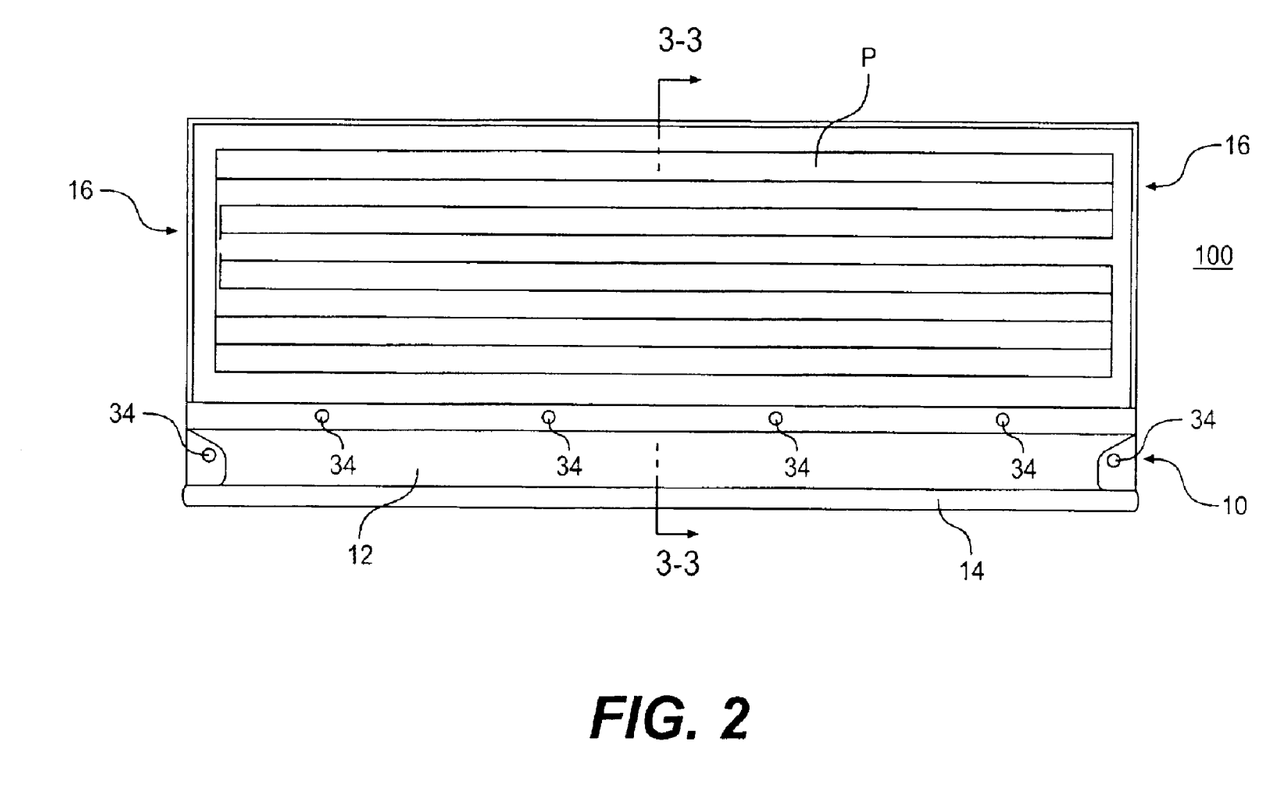
FIG. 2 is a front elevational view of the panel unit illustrated in FIG. 2.
Figure 8A:
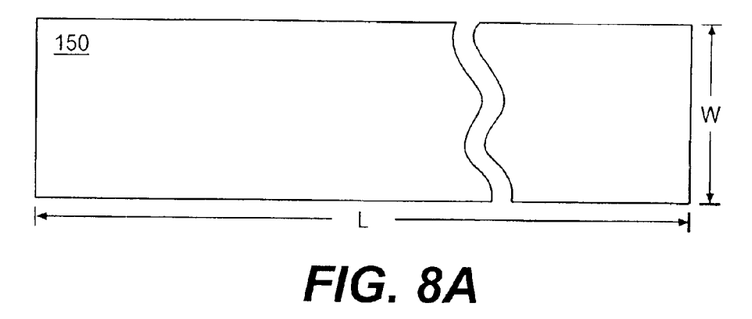
FIGS. 8A–8C illustrate a method of manufacturing a frame.
Figure 8B:
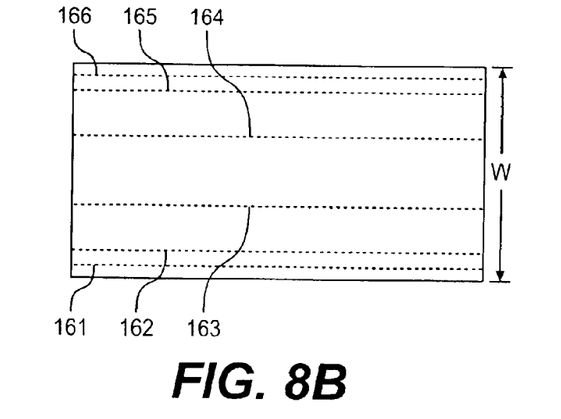

U.S. Pat. No. 6,105,317 to Tomiuchi et al. discloses a solar panel mounting system having a plurality of vertical rails. Referring to FIGS. 2, 8A and 8B, among others, Tomiuchi's device is also relatively complex, and requires mounting surface penetrations.

U.S. Pat. No. 6,370,828 B1 to Genschorek discloses a mounting system for a solar panel 1. The mounting system illustrated in FIG. 1, however, requires three separate interlocking roof profiles to support an edge of the solar panel 1. Multiple roof profiles increases complexity of installation and manufacturing.

U.S. Pat. No. 5,768,831 to Melchior discloses a rooftile support for a photocell panel. Melchior's support however, is formed from a roof tile. Therefore, the direction and elevation of the solar panel 6 included in the rooftile support cannot be adjusted according to the predominant direction of sunlight.

SUMMARY

According to a first embodiment, a mounting structure for a solar panel comprises a frame. The frame comprises a front wall, a bottom wall connected to the front wall, a back wall connected to the bottom wall, a first panel support connected to the front wall, and a second panel support connected to the back wall.

According to a second embodiment, a panel system comprises a plurality of panel units arranged in at least one row of panel units, each panel unit comprising a frame having a front wall, a bottom wall connected to the front wall, a back wall connected to the bottom wall, the front, bottom, and back walls forming an elongated chamber within the frame, a first panel support connected to the front wall, and a second panel support connected to the back wall. A solar panel is supported by the first and second panel supports of each panel unit, wherein the front walls of the frames in a row are aligned, and the back walls of the frames in a row are aligned.

A method of making a solar panel mounting structure comprises providing a sheet of metal, cutting the sheet of metal to a desired shape, bending the sheet at a first bend to form a front wall, bending the sheet at a second bend to form a back wall, wherein a bottom wall extends between the front wall and the back wall, bending the sheet at third and fourth bends to form a first panel support at the front wall, and bending the sheet at fifth and sixth bends to form a second panel support at the back wall.

A method of installing a solar panel system comprises providing a plurality of mounting structures, each mounting structure comprising a frame having a front wall, a bottom wall connected to the front wall, a back wall connected to the bottom wall, the front, bottom, and back walls forming an elongated chamber within the frame, a first panel support connected to the front wall, and a second panel support connected to the back wall. The mounting structures are placed in a row so that front and back walls of the panels in a row are aligned. Solar panels are then mounted in the mounting structures, and the solar panels are electrically connected.

Those skilled in the art will appreciate the above stated advantages and other advantages and benefits of various embodiments of the invention upon reading the following detailed description of the embodiments with reference to the below-listed drawings.

According to common practice, the various features of the drawings are not necessarily drawn to scale. Dimensions of various features may be expanded or reduced to more clearly illustrate the embodiments of the invention.

BRIEF DESCRIPTION OF THE DRAWINGS

The detailed description will refer to the following drawings, wherein like numerals refer to like elements, and wherein.

DETAILED DESCRIPTION

Figure 1:
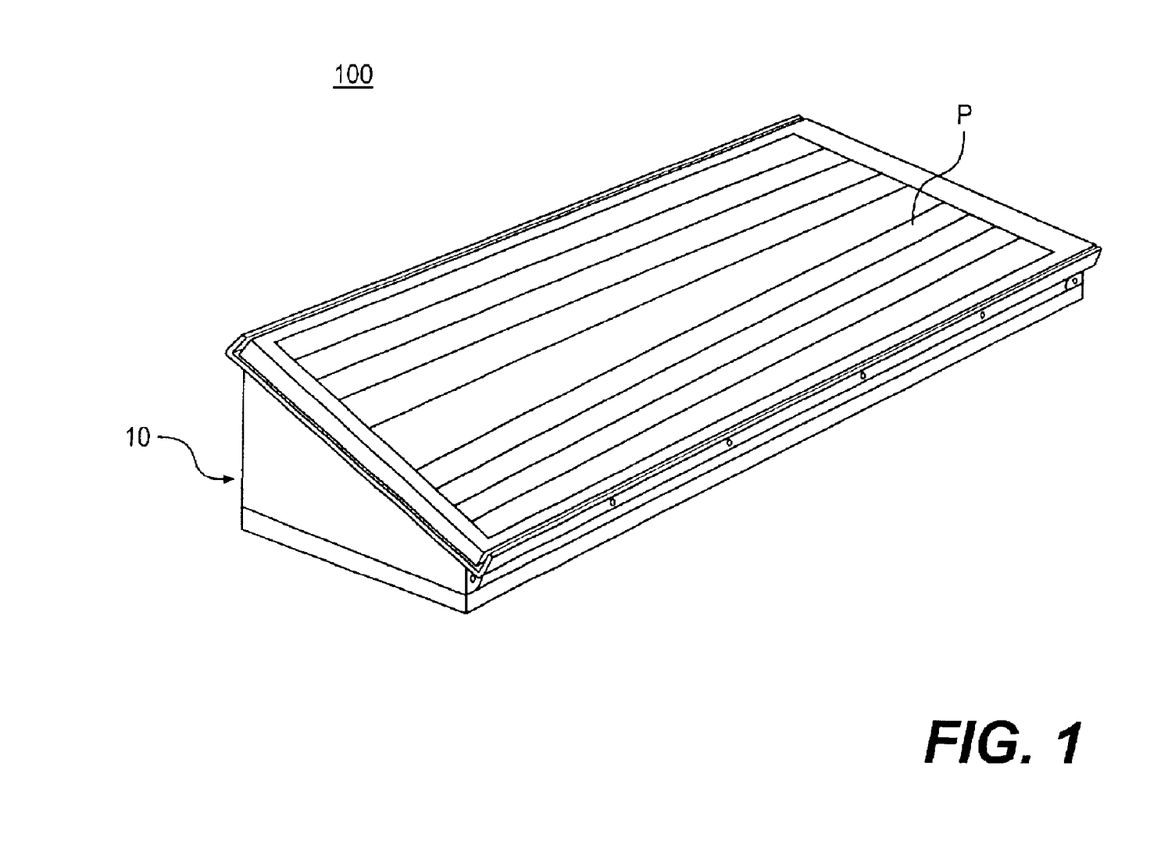
FIG. 1 is a perspective view of a panel unit according to a first embodiment.

FIG. 1 is a perspective view of a solar panel unit 100 according to a first embodiment. The panel unit 100 comprises a mounting structure 10 and a solar panel P supported by the mounting structure 10. The panel unit 100 is of a type that may be mounted on, for example, a rooftop. Other mounting surfaces, such as, for example, a relatively flat surface at ground level, are also suitable for mounting the mounting panel unit 100. Relatively level and mildly sloped mounting surfaces are preferred.

Figure 3:
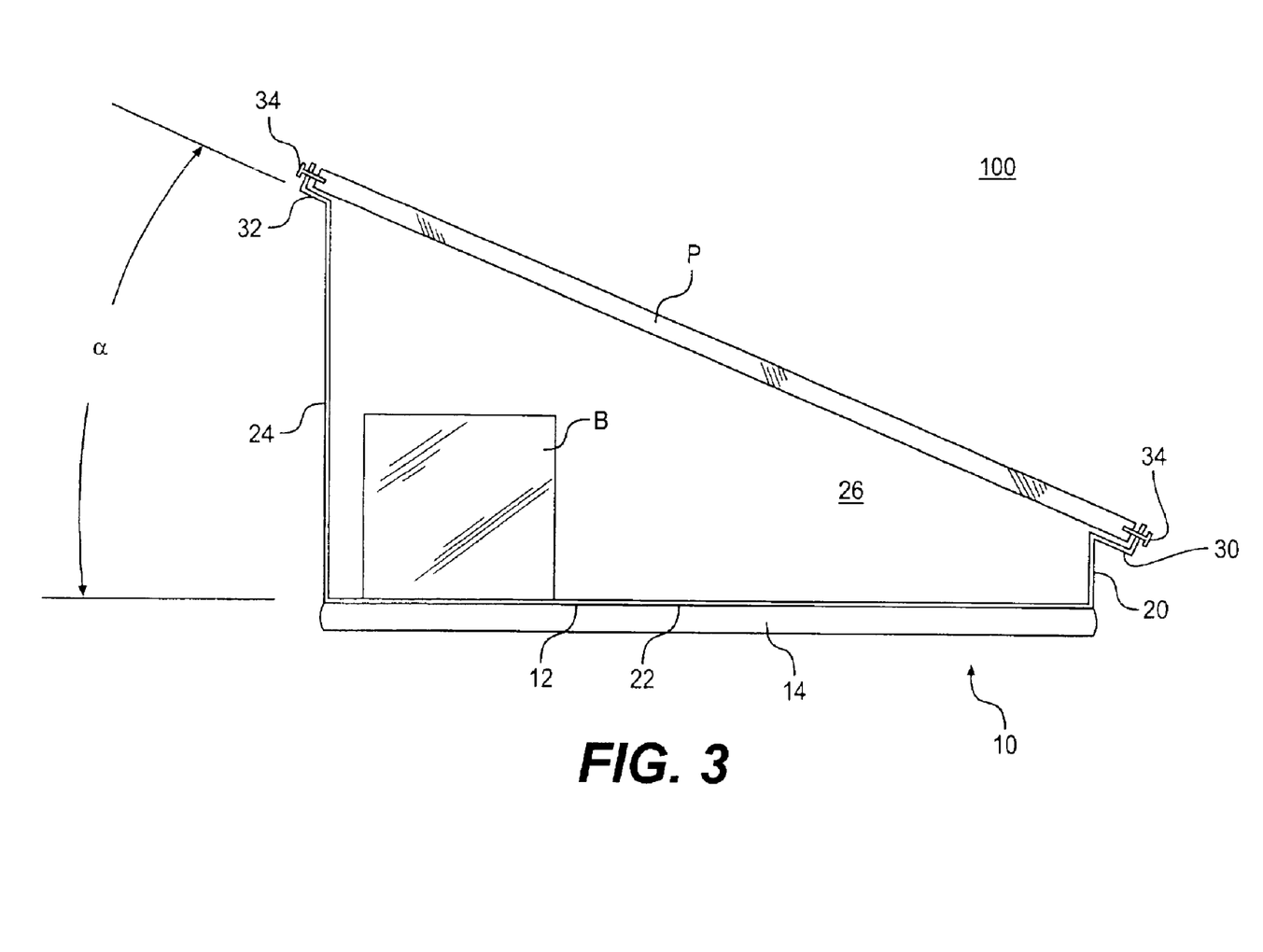
FIG. 3 is a sectional view in side elevation of the panel unit taken on line 3—3 in FIG. 2.

FIG. 2 is a front elevational view of the panel unit 100 illustrated in FIG. 1, and FIG. 3 is a sectional view of the panel unit 100 taken on line 3—3 in FIG. 2. Referring to FIG. 2, the mounting structure 10 includes a frame 12. The frame 12 may be mounted on a mat 14, which is in turn disposed over the mounting surface for the panel unit 100. The mat 14 prevents direct contact of the frame 12 with the mounting surface supporting the frame 12. The panel unit 100 can be mounted on any relatively stable mounting surface, such as, for example, a rooftop. Endcaps 16 may be attached at either end of the frame 12, thereby closing off the interior of the mounting structure 100. An endcap 16 is illustrated in detail in FIG. 4A.

The sectional view FIG. 3 illustrates the panel unit 100 in greater detail. As shown in FIG. 3, the frame 12 includes a front wall 20, a bottom wall 22, and a back wall 24. The frame 12 has a continuous open channel structure, and encloses an elongated chamber 26. A first panel support 30 extends from the front wall 20, and a second panel support 32 extends from the back wall 24. The panel supports 30, 32 support the panel P in the mounting structure 10. The panel P therefore closes off the top of the elongated chamber 26.

The panels supports 30, 32 can be formed from, for example, one or more bends in the frame 12. The panel supports 30, 32 illustrated in FIG. 3 are relatively simple structures formed from as few as two bends in a sheet material used to form the frame 12. The panel supports 30, 32 may include, for example, one or more apertures (see also FIG. 2) in which screws 34 can be advanced. The apertures can be preformed in the panel supports 30, 32, or technicians can drill apertures during installation of the panel unit 100. The panel P can include a metal frame having corresponding apertures, or apertures can be formed in the panel P frame during installation. The screws 34 may be screwed into the frame 12 and also into the apertures in the panel P to securely hold the panel P in place in the mounting structure 10. The screws 34 can be, for example, self-tapping screws.

The panel unit 100 may also include ballast B within the elongated chamber 26. The ballast B is placed in the frame 12 to keep the panel unit 100 stationary during, for example, high winds or other adverse weather conditions. The weight of the ballast B is typically selected according to the requirements of local building codes where the panel unit 100 is to be installed. In one embodiment, the ballast B is selected to impart a weight of about 43 lbs per lineal foot of panel unit. The selection of ballast weight, however, is subject to many factors, and a wide range of ballast weights may be used.

As is evident from FIG. 3, the frame 12 can be formed from a single sheet of material, such as, for example, a metallic sheet. In a preferred embodiment, the frame 12 is formed from an elongated sheet of aluminum. Aluminum is a desirable material for construction because it is lightweight and relatively easy to form. Aluminum is also corrosion-resistant, and will not degrade over time with exposure to ultraviolet rays, as will many plastics. Other metals in sheet form, such as steel, and alloys thereof, may also be used. A preferred range of thicknesses for aluminum sheet material is about 0.04" to 0.25".

The panel unit 100 shown can have any dimensions suitable for supporting a selected solar panel P. For example, in one commercial embodiment, the panel unit 100 can have a length of, for example, about ten feet, and a height (measured along the back wall 24) of about 1½ feet. The inclination angle α that the panel P is supported at can be selected according to the expected environment in which the panel unit 100 will be installed. For example, in the embodiment illustrated in FIG. 3, the inclination angle α is about 27°.

Figures 4A, 4B, 7:
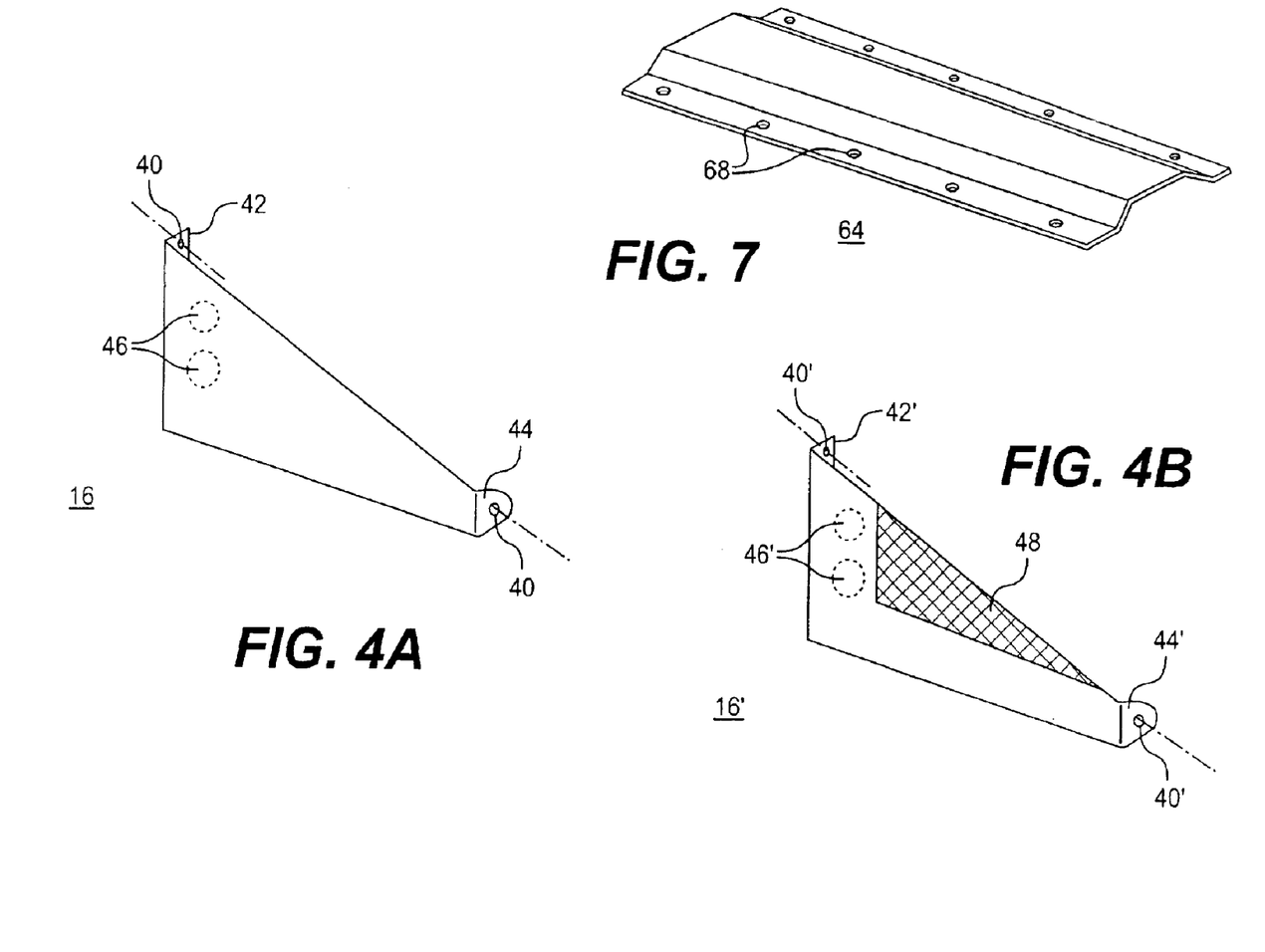
FIG. 4A is perspective view of a first embodiment of an endcap.
FIG. 4B is a perspective view of a second embodiment of an endcap.
FIG. 7 is a perspective view of the stiffening member illustrated in FIG. 6.

FIG. 4A is perspective view of a first embodiment of an endcap 16. The endcap 16 can be formed from, for example, a piece of cut or stamped sheet metal. Aluminum is a preferred material of construction. The endcap 16 includes two attachment portions 42, 44 used to attach the endcap 16 to the frame 12 (see FIG. 2). The endcap 16 may have apertures 40 formed in the attachment portions 42, 44 to receive the screws 34 (FIG. 2) for attaching the endcap 16 to the frame 12. The endcap 16 may also include one or more knockouts 46 stamped in the endcap 16 to facilitate interconnection between adjacent panel units 100, and for connection of the panel P with other devices. The endcap 16 shown in FIG. 4 is the "left" endcap 16 shown in FIG. 2. The "right" endcap 16 may be a mirror image of the left endcap 16.

FIG. 4B is a perspective view of an alternative embodiment of an endcap 16'. The endcap 16' is similar to the endcap 16 illustrated in FIG. 4A, as evidenced by the similar numbering of elements in FIG. 4B. The endcap 16', however, includes a vent 48. The vent 48 may be in the form of, for example, a screen held in place by welds or screws. The vent 48 can also be formed by forming apertures in sheet metal used to form the endcap 16'.

The endcaps 16, 16' are not required in the panel units 100. However, the endcaps 16, 16' improve the structural rigidity of the panel unit 100. The endcaps 16, 16' also close off the interior chamber 26 of the panel unit 100 (FIG. 3), preventing small animals such as birds from entering the chamber 26 and possibly damaging circuitry on the underside of the panel P. The vented endcap 16' provides the added advantage that excess heat within a panel unit 100 may be vented by airflow traveling through the vent 48.

Figures 5A, 6:
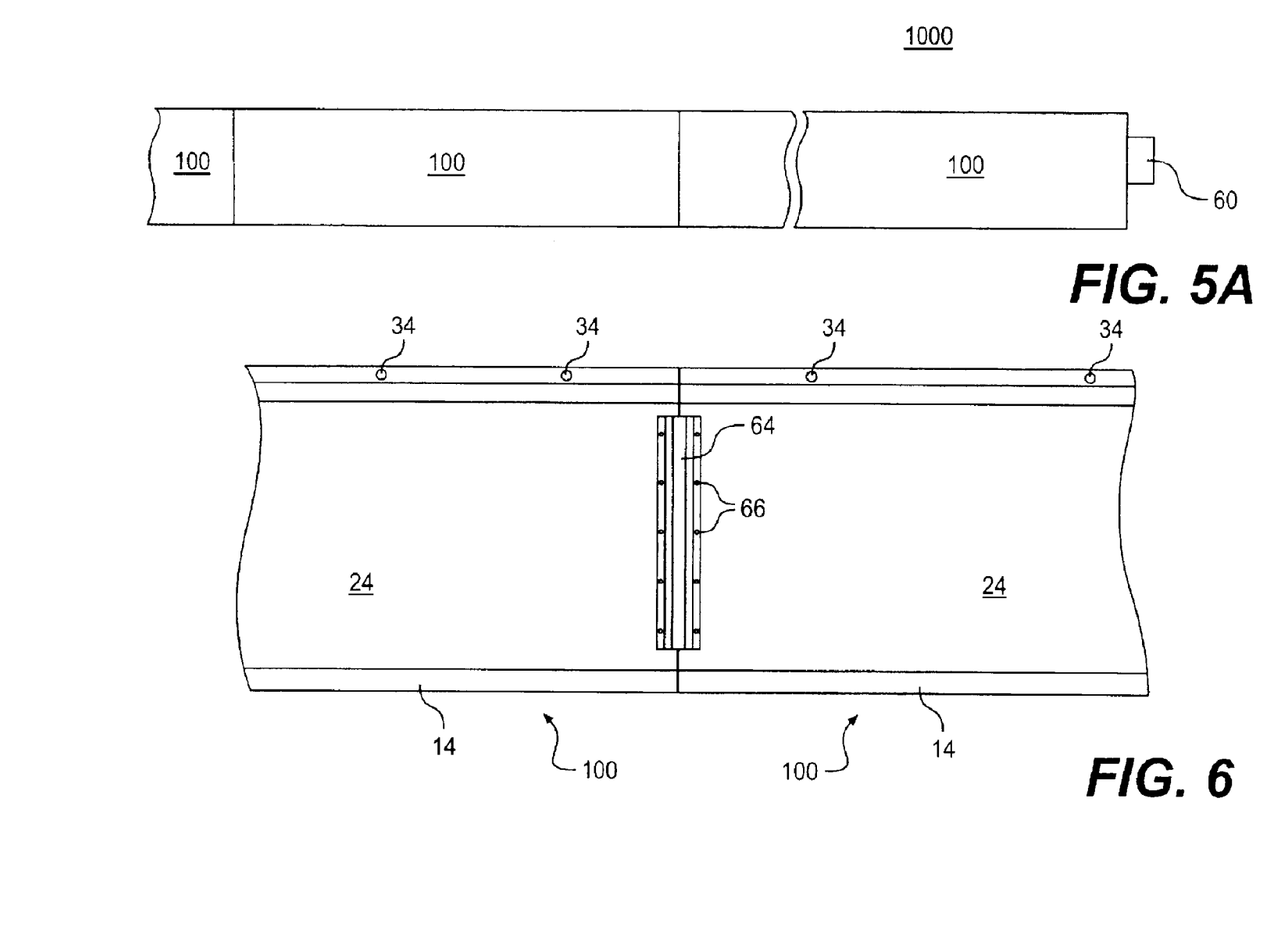
FIG. 5A is a top plan schematic view of a panel system.
FIG. 6 is a rear elevational view of a portion of the panel system illustrated in FIG. 5A.

The panel unit 100 may be combined with other panel units to form an array or system of solar panels. FIG. 5A is a top plan schematic view of such a panel system 1000. As shown in FIG. 5A, the panel system 1000 includes a plurality of panel units 100 in an end-to-end arrangement. The solar panels P included in the panel units 100 can include circuitry on the back side of the panels P, facing into the elongated interior chamber 26 (FIG. 3) of each panel unit 100. One or more cables and connectors can be used to interconnect the panels P. If endcaps 16 or 16' are included in the panel units 100, the interconnect cabling can be routed through the knockouts 46, 46' (see FIGS. 4A and 4B). Preferably, however, endcaps are only placed on the panel units 100 at the end of a row of panel units 100.

Figure 10:
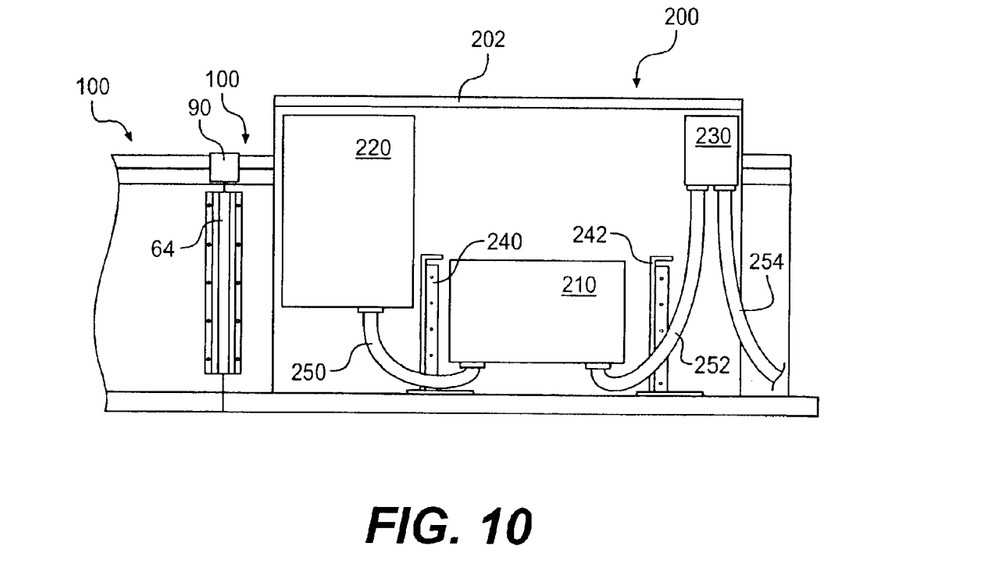
FIG. 10 is a rear elevational view of a DC-AC conversion unit mounted to a panel unit.
Figure 11:
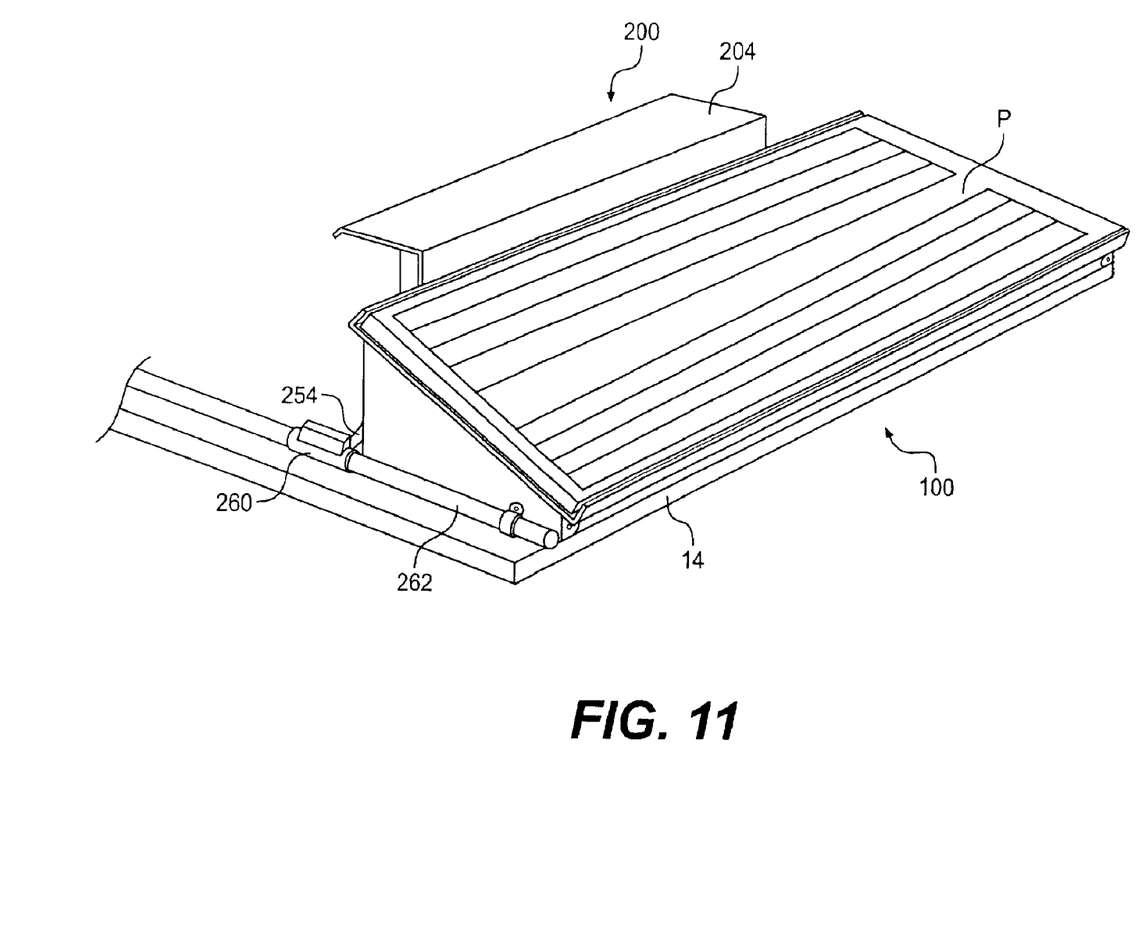
FIG. 11 is a perspective view of the DC-AC conversion unit illustrated in FIG. 9 and additional power cabling.

The panels P generate DC power that is conveyed from the panels P by the interconnect cabling. The interconnect cabling can be routed to a DC-AC converter 60 which may be mounted to one of the panel units 100, as show in FIG. 6. Alternatively, DC-AC converters can be included inside one or more of the panel units 100, or, a DC-AC converter can be located at a remote site and connected to the system 1000 by interconnect cabling. An alternative DC-AC conversion unit 200 is illustrated in FIGS. 10 and 11.

The panel units 100, included in the system 1000 can be arranged on mats 14, as shown in FIGS. 1–3. The dimensions of the mats 14 can be selected to correspond generally to the size or "footprint" of the bottom walls 22 of the frames 12. Alternatively, a single continuous mat can be sized to accommodate a row of panel units 100 in the system 1000.

FIG. 6 is a rear elevational view of a portion of the panel system 1000 illustrated in FIG. 5A. In FIG. 6, the panel units 100 are shown as abutting. However, a gap may be included between one or more of the panel units 100. A stiffening member 64 may be mounted to the two adjacent panel units 100 in FIG. 6. FIG. 7 is a perspective view of the stiffening member 64. Referring to FIGS. 6 and 7, the stiffening member 64 can include one or more apertures 68 on either side of the stiffening member 64, which may receive screws 66 for attaching the stiffening member 64 to the adjacent panel units 100. The back walls 24 of the panel units 100 may include corresponding apertures for receiving the screws 66. Alternatively, the apertures may be formed during installation of the system 1000. Stiffening members 64 can be used to connect one or more adjacent panel units 100, thereby increasing the structural rigidity of the system 1000. The stiffening members 64 can be formed from, for example, sheet metal. Aluminum is a preferred material of manufacture.

Each of the panel units 100 may include an endcap 16 or 16' at each end. Alternatively, an endcap 16 or 16' may be used only at each end of the system 1000. In that arrangement, a continuous open chase extends through the entire system 1000, allowing easy access to interconnect wiring between panels P. Use of vented endcaps 16' at each end of the system 1000 allows for better cooling of the continuous open chase of the system 1000.

A single row of panel units 100 comprises the system 1000 shown in FIG. 5A. Referring to the schematic illustration of FIG. 5B, a plurality of rows of panel units 100, preferably arranged in parallel and spaced from one another, can also form the system 1000. In that case, a minimum spacing d is used between the rows. The minimum spacing d may be selected so that shadow from nearby rows does not interfere with sunlight reaching a row.

The panel units 100 can include one or more apertures (not illustrated) formed in the bottom walls 22 of the frames 12 (see FIG. 3), or, near the bottom of the front walls 20 or back walls 24. The apertures, or "weep holes" allow water entering the chamber 26 to escape from the frame 12. A small gap (not illustrated) may also be included between the bottom of a frame 12 and the bottom of an endcap 16 or 16', to allow for ventilation and water drainage from the interior of the system 1000.

The system 1000 can be installed in the following manner, with reference to FIGS. 1–7: First, a straight line is established on the mounting surface, the line running generally perpendicular to the predominant direction of incoming sunlight, and having a length equal to the length of the system 1000. The line will serve as an alignment device to ensure that the first row of panel units 100 in the system 100 is properly arranged. If mats 14 are to be used, the individual mats 14 may be laid out for all of the panel units 100 on the surface where the system 1000 will be mounted, along the line. If a single continuous mat is to be used, that mat may instead be laid out on the mounting surface along the line.

Mounting structures 10 are then lined up end-to-end along the straight line, on top of the mats or mat 14. Referring to FIG. 3, the front walls 20 of the mounting structures 10 are aligned, as are the back walls 24. Any number of mounting structures 10 can be used, and the number of panel units 100 in the system is selected based on the power required from the system 1000. The size of the mounting surface also determines the size and shape of the system 1000. The front walls 20 of the mounting structures 10 are arranged to face a direction of the predominant supply of sunlight. The angle α (FIG. 3) of the mounting structures 10 may be preselected according to the latitude of the installation site. Next, ballast B is placed in the chambers 26 of each of the mounting structures 10. The weight of the ballast B can be selected according to the requirements of, for example, building codes.

The mounting structures 10 may be placed in line so that they abut one another. Stiffening members 64 may be used to connect abutting pairs of mounting structures 10 at any time after the mounting structures have been placed.

Solar panels P may then be mounted on the mounting structures 30, 32 of the frames 12, and secured by the screws 34 (FIG. 3). The solar panels P may be connected to interconnect wiring that is long enough to extend to an end of the frames 12 and to connect with an adjacent panel unit 100, or to other devices. The interconnect wiring of the panels P may be interconnected during installation of the panels P.

If endcaps 16 or 16' are used, endcaps 16, 16' are next secured to either end of the row of panel units 100, thereby closing off the interior of the system 1000. One or more knockouts 46, 46' (FIGS. 4A and 4B) may be knocked out of an endcap 16, 16' and the interconnect wiring from the panels P can be pulled through the knockouts 46, 46'. Alternatively, holes may be drilled in an endcap 16, 16' to allow the wiring to be pulled out.

Any number of panel units 100 may be connected end-to-end in the manner described above. When the array of panel units 100 is complete, the interconnect circuitry from the panels P can be connected to a DC-AC converter 60 mounted on one of the panel units 100. The DC-AC converter 60 can be mounted at the endcap 16 or 16' where the interconnect wiring for the panel P exits the interior of the system 1000. The DC-AC converter 60 can also be mounted on the back wall of a panel unit 100. An alternative DC-AC conversion unit is illustrated in detail in FIGS. 9 and 10.

Figure 5B:
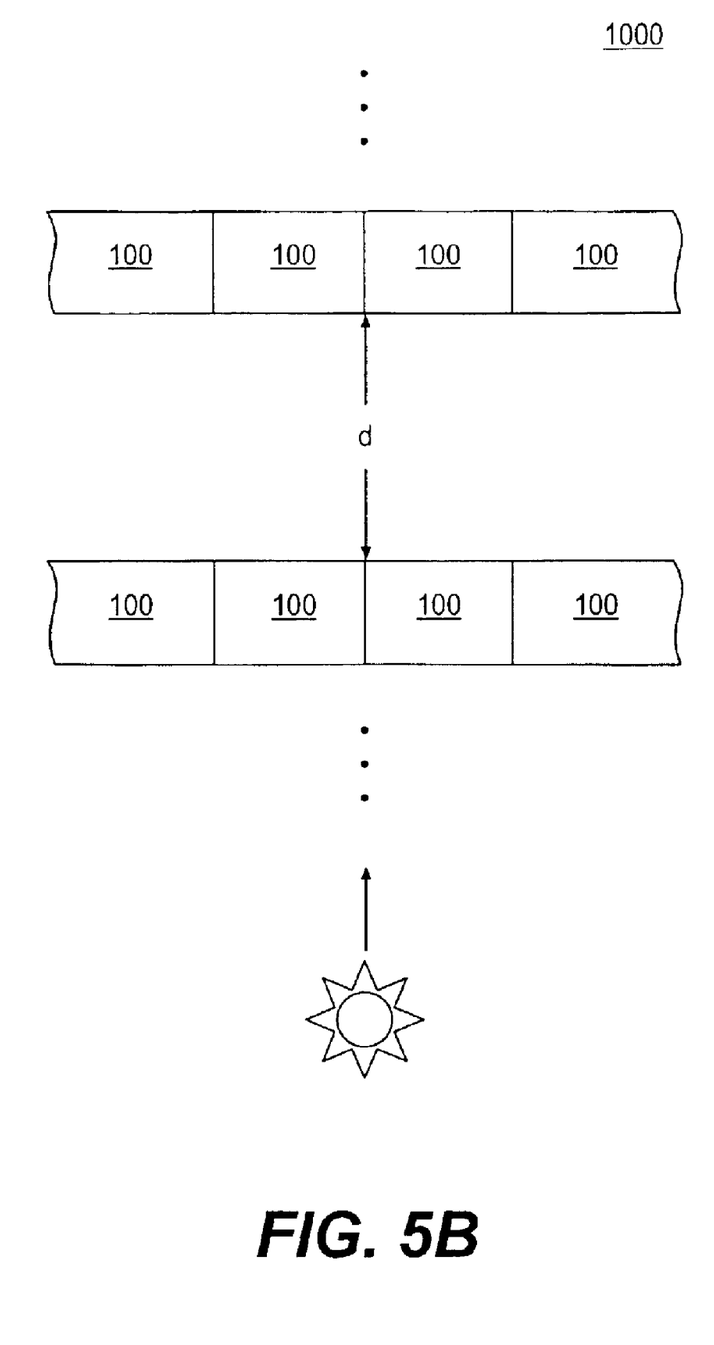
FIG. 5B is a top plan schematic of a panel system.

Any number of rows of panel units 100 can be arranged on a mounting surface according to the above method. As shown in FIG. 5B, the rows should be spaced at some minimum distance d to prevent shadow interference between rows.

Figure 8C:
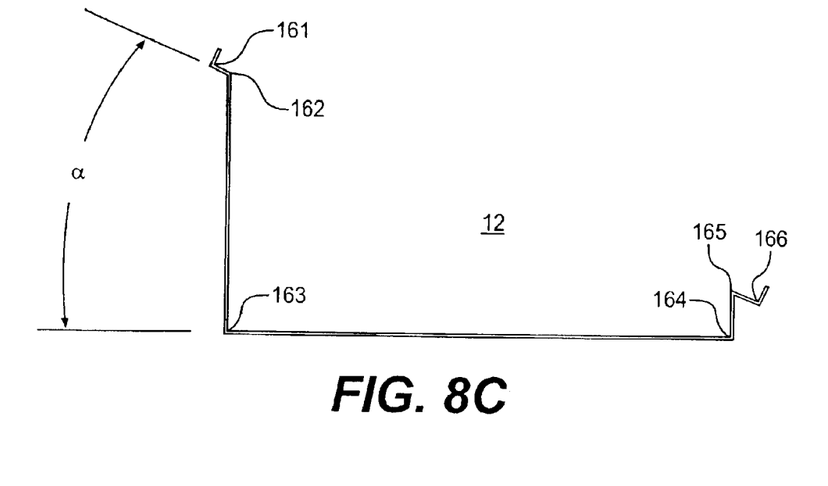

The mounting structure 10 used in the panel units 100 have a relatively simple construction, which may be easily manufactured. For example, referring to FIG. 3, the frame 12 may be manufactured from a single piece of metal sheet material. A method of manufacturing a frame is illustrated in FIGS. 8A–8C. In FIG. 8A, sheet metal 150 is provided. The metal sheet 150 may have a length L corresponding to a width (as measured across the front of the frame 12—FIG. 2) of several panel units 100. The width W of the metal sheet 150 can correspond to the sum of the lengths of the individual sections of the frame 12 as shown in FIG. 3.

Referring to FIG. 8B, the metal sheet 150 can be cut or stamped to size to form a blank 152. The blank 152 may also be preformed and provided having the correct dimensions. Any holes or other apertures (not shown) in the blank 152 can then be punched in the blank 152 at their respective locations. Bend locations 161–166 are illustrated on the blank 152.

The blank 152 may then be bent along its length at the respective bend locations 161–166 shown in FIG. 8C. A metal brake, for example, may be used to bend the blank 152. Only six bends are required to form the frame 12.

Holes may alternatively be drilled in the front wall 20 and the back wall 24 to receive the screws 66 (FIG. 6) and 34 (FIG. 2) after bending of the blank 152 in the metal brake. Further, if self-tapping screws are used, it may not be necessary to drill holes in the frame 12.

The endcaps 16 or 16' (illustrated in FIGS. 4A and 4B) may be formed from cut or stamped sheet metal patterns. A first bend is used to form the attachment portion 42 and a second bend is used to form the attachment portion 44. Apertures in the endcaps 16, 16' for receiving screws may be formed by drilling or punching. The apertures 40 may be formed before or after the bending operations. The vent 48 in the endcap 16' can be formed by, for example, welding or screwing a screen to sheet metal used to form the endcap 16'. Apertures may also be cut or stamped in the sheet metal used to form the endcap 16' in order to form the vent 48. The mat 14 (FIG. 3) may be formed from, for example, a rubber or plastic material. The mat 14 may also be made from a sheet of rigid insulation.

According to the panel unit 100 and the panel system 1000 embodiments discussed above, the panel unit 100 has a relatively simple design that is easy and inexpensive to manufacture. Further, installation of the panel unit 100 requires minimal skill, and a system 1000 of panel units 100 can therefore be quickly and easily installed with a minimal cost of labor. Because of the simplicity of the design of the mounting structure 10, the structure 10 can also be manufactured very quickly, reducing turnaround time for orders of the device.

The mounting structure 10 is also very light in weight, rendering transport of the mounting structure 10 easier. A typical commercial embodiment of a mounting structure, having a length of 10 feet, such as the one discussed above, will have weight (not including the ballast B or the solar panel P) of only about 40 pounds. Therefore, a single technician can easily move the mounting structure without assistance. This feature is particularly advantageous when panel units 100 are to be installed on an elevated mounting surface, such as a rooftop. As a further advantage, the shape of the frame 12 of the mounting structures 10 allows the structures 10 to be stacked while in storage or in transport.

As shown in FIG. 1, the panel unit 100 has an aesthetically smooth and continuous exterior appearance, especially when endcaps 16 or 16' are included on the panel unit 100. The smooth exterior of the panel unit 100 also greatly reduces the wind uplift force exerted on the panel unit 100. Wind uplift forces are a primary concern when installing solar panel arrays.

As a further advantage of the above embodiments, the panel unit 100 is easy to move during or after installation. The panel unit 100 does not require bolting or screwing to the mounting surface, and penetrations in the mounting surface are thereby avoided. If, for example, a panel unit 100 is installed as part of system 1000, the panel unit 100 can be easily moved, removed or replaced, by disconnecting any interconnection circuitry between adjacent panel units 100 (and removing stiffening members 64, if present). Watertight quick disconnect plugs can be used to connect the solar panels P in adjacent panel units 100, speeding installation and removal. An entire system 100 of panel units 100 may therefore be easily relocated and rearranged.

Figure 9A:
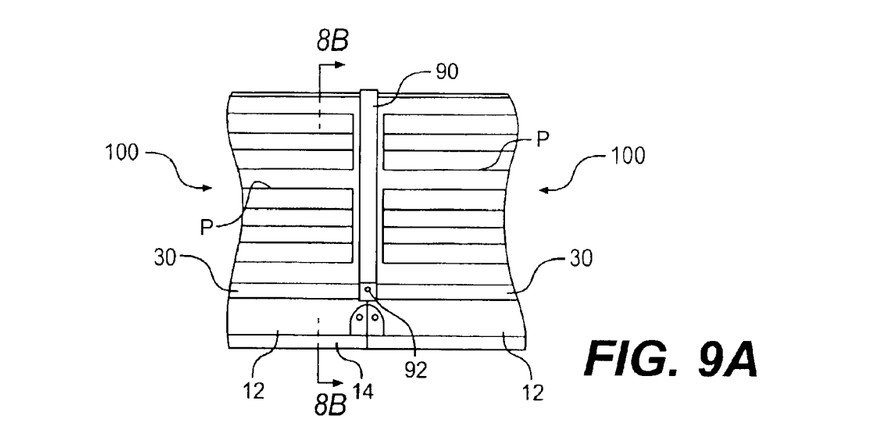
FIG. 9A is a front elevational view of a securing strap mounted between adjacent panel units.
Figure 9B:
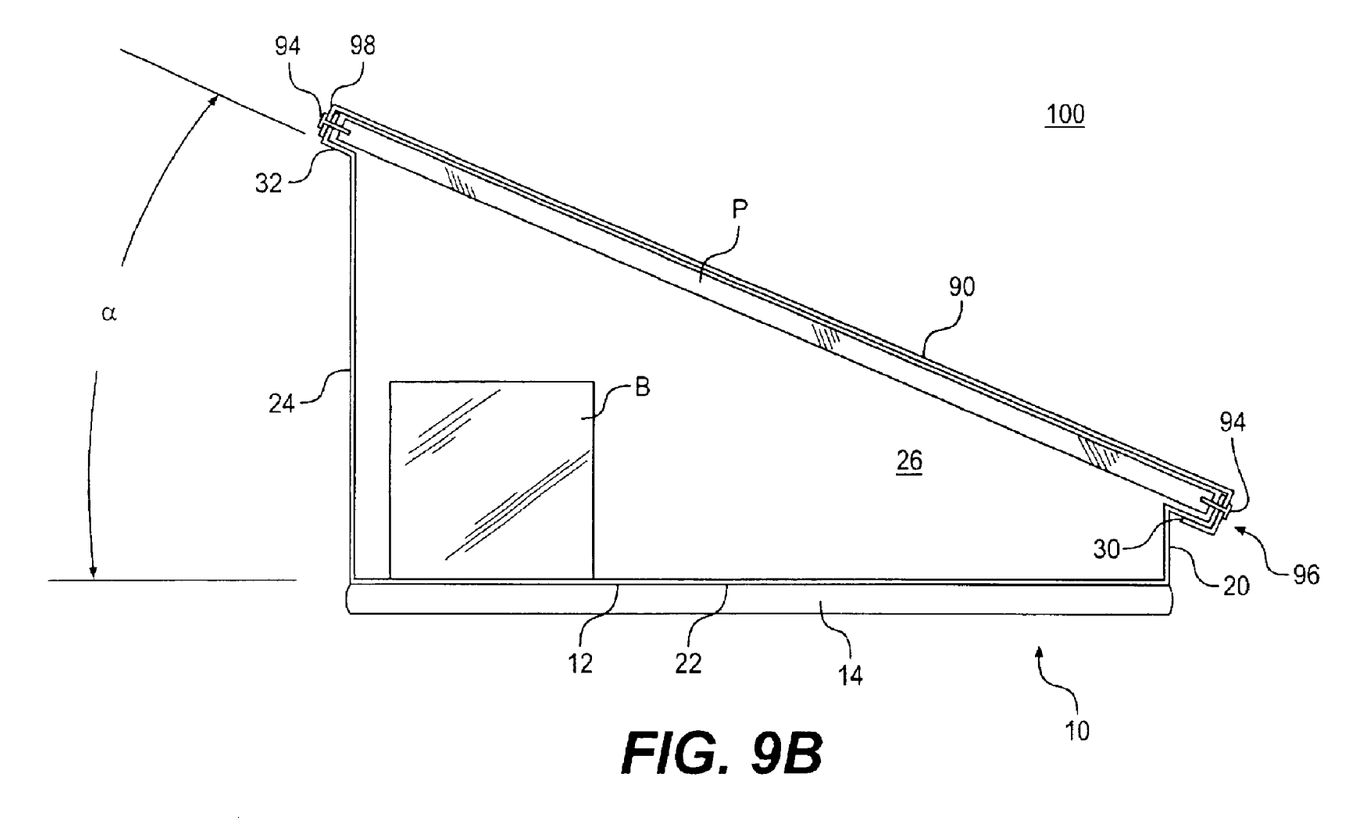
FIG. 9B is a sectional view of a panel unit taken on line 8B—8B in FIG. 8A.

FIG. 9A is a front elevational view of a securing strap 90 mounted between two panel units 100. The securing strap 90 can be wide enough to extend over a portion of each of the adjacent panels P. The width of the securing strap 90 can be about, for example, two inches. FIG. 9B is a sectional view taken on line 9B—9B in FIG. 9A, and illustrates the securing strap 90 in further detail.

Referring to FIG. 9B, the securing strap 90 extends over the panel P and securely retains the panel P in place in the mounting structure 10. The securing strap 90 also adds rigidity to the system 1000. The added rigidity may prevent spreading of the system 1000 under a snow load. Securing straps 90 in the system 1000 can also reduce or eliminate the number of screws 34 required to secure the panels P in the panel units 100. The securing strap 90 can be secured to the frame 12 of mounting structure 10 by screws 94. The screws 94 can be advanced into the panel supports 30, 32, and further advanced into a panel P. The strap 90 includes an upper portion 98 that may closely conform to the panel support 32, and a lower portion 96 that may closely conform to the panel support 30. A gap is illustrated between the strap 90 and the panel P. The strap 90 may, however, contact and exert a downward force on the panel P to maintain the panel P in position in the frame 12.

FIG. 10 is a rear elevational view of a DC-AC conversion unit 200. FIG. 11 is a perspective view of a portion of a panel system having the conversion unit 200. The conversion unit 200 comprises an inverter 210, a DC disconnect 220, and an AC disconnect 230. The inverter 210 and the disconnects 220, 230 can be interconnected by flexible conduit 250, 252 that contains cables for conveying AC and DC current.

The conversion unit 200 may include a frame 202 for mounting the inverter 210 and the disconnects 220, 230. The frame 202 can include an overhang portion 204 (the overhang portion 204 is illustrated in FIG. 10) that provides some protection from the elements for the inverter 210 and the disconnects 220, 230. The frame 202 can include brackets 240, 242 to increase the stability of the frame 202. The frame 202 can also be screwed to the back of the panel unit 100 at one or more locations.

Referring to FIG. 11, the conversion unit 200 is located at the end panel unit 100 in a row of panel units 100 of a panel system 1000. Only one panel unit 100 is illustrated in FIG. 10. Rows of panel units 100 in a panel system 1000 are illustrated in FIG. 5A. The conversion unit 200 acts to covert the DC power supplied from all of the panel units 100 in a row. As discussed above, each of the panel units 100 can be connected in series through a continuous open chase in the row of panel units 100. The end of the series circuit connection of the panel units 100 can be connected to the DC disconnect 220. The DC disconnect is electrically connected to the inverter 210, which converts the DC current from the panels P in the panel units 100 into AC current.

Referring to FIG. 11, the AC disconnect 230 can be coupled to a hard conduit 262 by a flexible conduit 254 at a coupling 260. The conduit 262 and the conduit 254 can house one or more conductive cables for conveying AC current from the row of panel units 100. The conduit 262 may extend rearward to subsequent rows in the panel system 1000, with each of the conversion units 200 of a row having an electrical cable extending through the hard conduit 262.

Figure 12:
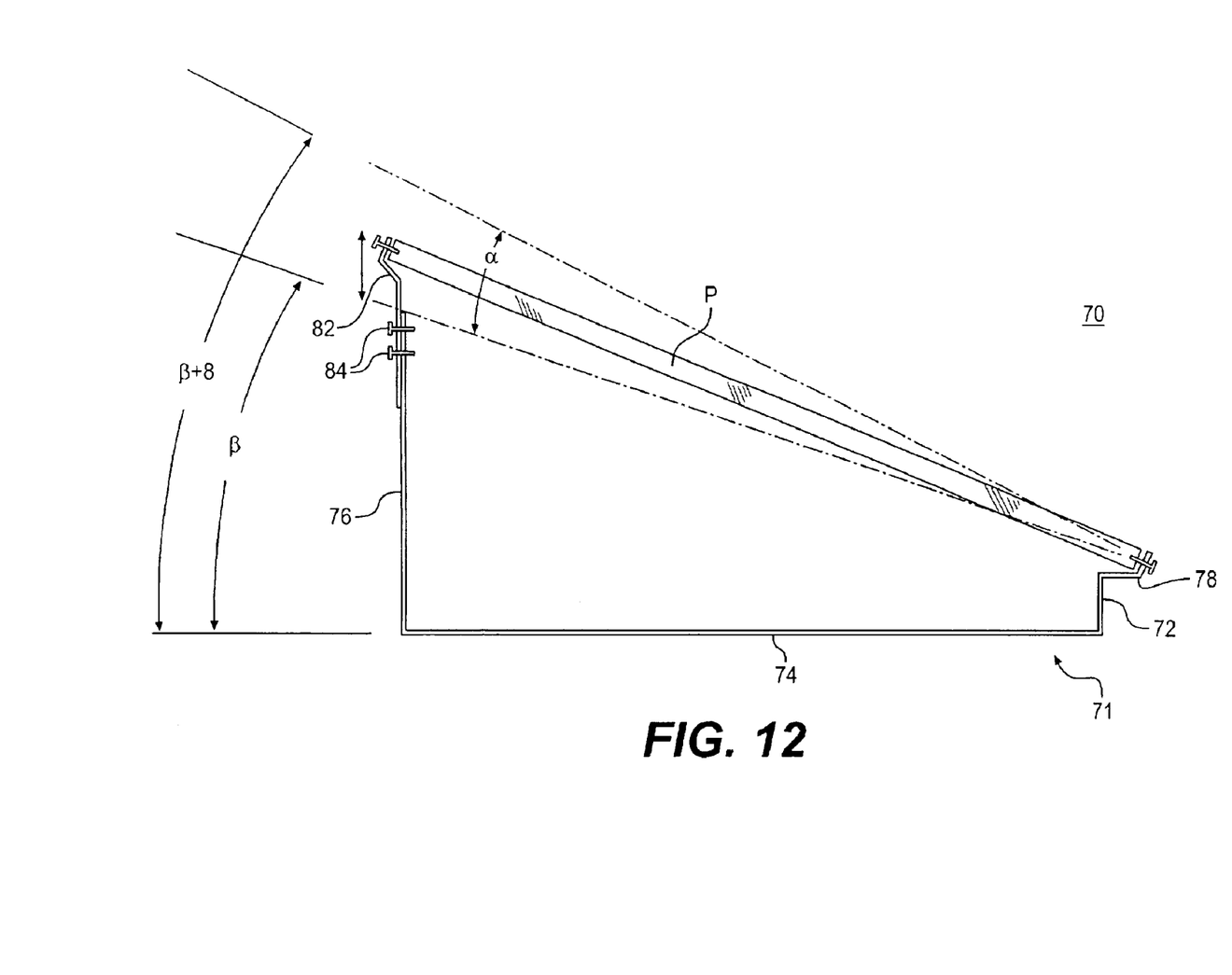
FIG. 12 is a sectional view of an alternative mounting structure embodiment.

FIG. 12 is a sectional view of an alternative mounting structure 70. The mounting structure 70 comprises a frame

71. The frame 71 includes a front wall 72, a bottom wall 74 and a back wall 76. A panel support 78 is connected to the front wall 72. An adjustable panel support 82 is adjustably mounted to the back wall 76. The vertical position of the panel support 82 can be adjusted by changing the position at which the panel support is secured to the back wall 76. Screws 84 can be used to secure the panel support 82 to the back wall 76. The adjustable panel support 82 can be adjusted to provide an inclination angle range of $\beta-\beta+\gamma$ for the panel P.

The foregoing description of the invention illustrates and describes the present invention. Additionally, the disclosure shows and describes only selected preferred embodiments of the invention, but it is to be understood that the invention is capable of use in various other combinations, modifications, and environments and is capable of changes or modifications within the scope of the inventive concept as expressed herein, commensurate with the above teachings, and/or within the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments, not explicitly defined in the detailed description.

What is claimed is:

1. A panel system, comprising:
   a plurality of panel units arranged in at least one row and mounted on a mounting surface in such a manner that the panel units do not penetrate the mounting surface, each panel unit comprising:
      a sheet metal frame comprising:
         a front wall;
         a bottom wall connected to the front wall;
         a back wall connected to the bottom wall, the front, bottom, and back walls forming an elongated chamber within the frame;
         a first panel support connected to the front wall; and
         a second panel support connected to the back wall; and
   a solar panel supported by the first and second panel supports of the frame, wherein the front walls of the frames in the at least one row are aligned, wherein the back walls of the frames in the at least one row are aligned, and wherein adjacent panel units in the at least one row are connected to each other by a stiffening member.

2. The panel system of claim 1, wherein:
   the back wall is taller than the front wall.

3. The panel system of claim 2, wherein:
   the first panel support extends from a first bend in the front wall and includes a second bend.

4. The panel system of claim 3, wherein:
   the second panel support extends from a first bend in the back wall and includes a second bend.

5. The panel system of claim 4, wherein:
   a portion of the first panel support extending from the first bend in the front wall extends substantially along a nonzero angle alpha with respect to the bottom wall; and
   a portion of the second panel support extending from the first bend in the back wall also extends substantially along the angle alpha.

6. The panel system of claim 5, wherein:
   a panel supported in the first and second panel supports extends along the angle alpha.

7. The panel system of claim 2, comprising:
   a mat disposed below the frame.

8. The panel system of claim 2, wherein each row of panel units includes a panel unit at a first end of the row, a panel unit at a second end of the row, and panel units between the end panel units.

9. The panel system of claim 8, wherein a continuous open chase extends through the panel units in a row.

10. The panel system of claim 9, comprising:
    an endcap mounted on each of the end panel units, the endcaps at least partially closing off the continuous open chase.

11. The panel system of claim 8, comprising:
    a DC to AC conversion unit proximate at least one row in the panel system.

* * * * *